(12) United States Patent
Gupta et al.

(10) Patent No.: US 7,720,015 B2
(45) Date of Patent: May 18, 2010

(54) RECEIVER ADC CLOCK DELAY BASE ON ECHO SIGNALS

(75) Inventors: Sandeep Kumar Gupta, Santa Clara, CA (US); Jose Tellado, Palo Alto, CA (US)

(73) Assignee: Teranetics, Inc., San Jose, CA (US)

( * ) Notice: Subject to any disclaimer, the term of this patent is extended or adjusted under 35 U.S.C. 154(b) by 1036 days.

(21) Appl. No.: 11/205,615

(22) Filed: Aug. 17, 2005

(65) Prior Publication Data

US 2007/0042721 A1 Feb. 22, 2007

(51) Int. Cl.
*H04B 3/20* (2006.01)
(52) U.S. Cl. .................. 370/286; 370/289; 375/219; 455/73
(58) Field of Classification Search .............. 375/219; 370/286, 289; 455/73
See application file for complete search history.

(56) References Cited

U.S. PATENT DOCUMENTS

| 4,918,725 | A | | 4/1990 | Takahashi | |
|---|---|---|---|---|---|
| 5,793,801 | A | * | 8/1998 | Fertner | 375/219 |
| 6,798,828 | B1 | * | 9/2004 | Phanse | 375/219 |
| 6,912,209 | B1 | | 6/2005 | Thi et al. | |
| 2004/0028159 | A1 | | 2/2004 | Abdelilah et al. | |
| 2004/0120391 | A1 | * | 6/2004 | Lin et al. | 375/219 |
| 2005/0018798 | A1 | | 1/2005 | Li | |

\* cited by examiner

*Primary Examiner*—Derrick Ferris
*Assistant Examiner*—Gbemileke Onamuti
(74) *Attorney, Agent, or Firm*—Brian R. Short (57) ABSTRACT

A device and method for a full-duplex transceiver is disclosed. The transceiver includes a transmitter DAC coupled to a transmission channel. The transmit DAC converting a digital transmission signal into an analog transmission signal. The transceiver further includes a receiver connected to the transmission channel. The receiver receives a desired signal and an echo signal, in which the echo signal includes at least a portion of the analog transmission signal. The receiver includes a receiver ADC, a programmable delay line for adjustably delaying a clock signal of the ADC, and a receiver processing circuit for adjusting the delay of the clock signal based at least in part upon the echo signal.

27 Claims, 9 Drawing Sheets

RECEIVER ADC CLOCK DELAY BASE ON ECHO SIGNALS

FIELD OF THE INVENTION

The invention relates generally to communication systems. More particularly, the invention relates to an apparatus and method for delaying a receiver ADC clock based on echo signals.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

Figure 1:
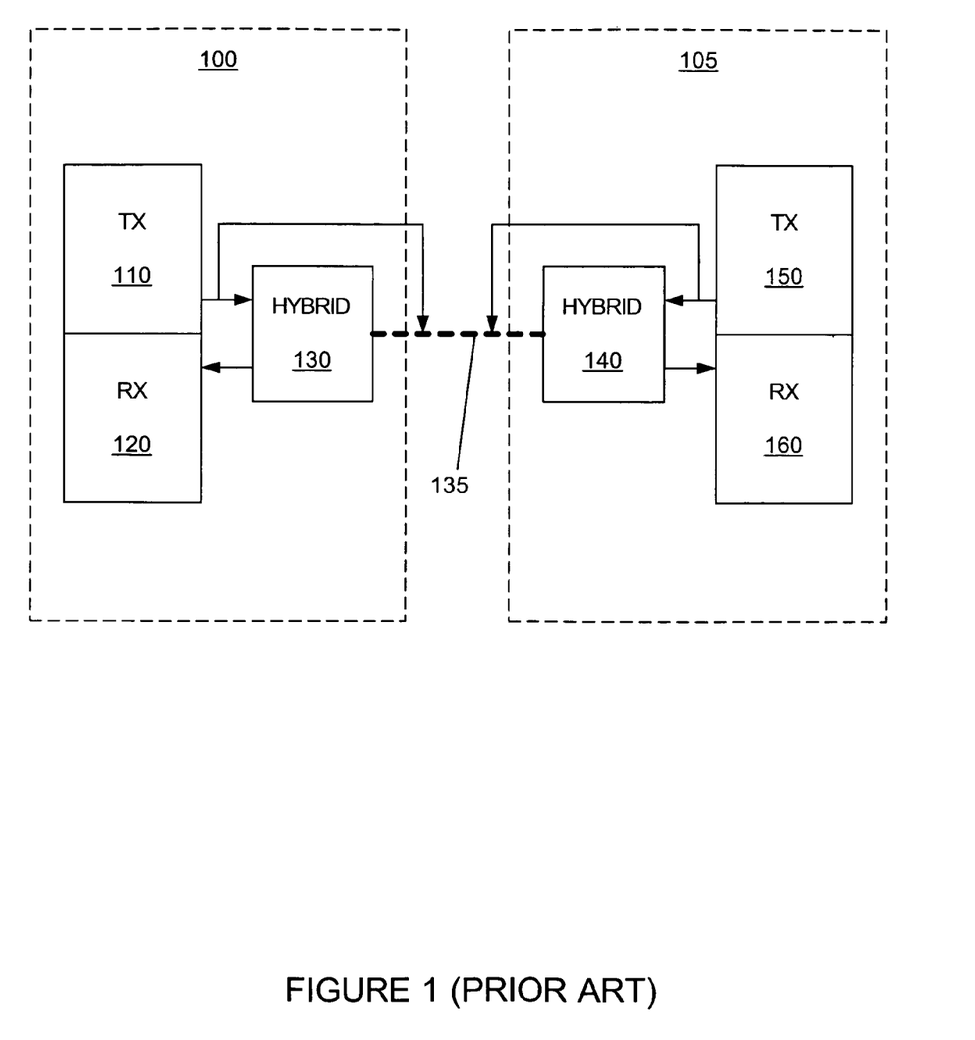
FIG. 1 shows a prior art pair of Ethernet transceivers.

FIG. 1 shows a block diagram of an Ethernet transceiver pair communicating over a bi-directional transmission channel, according to the prior art. The transceiver pair includes a first transceiver 100 and a second transceiver 105. The first transceiver 100 includes a transmitter section 110 that receives digital data for transmission over a transmission channel 135. The first transceiver 100 also includes a receiver section 120 that receives data.

The transceiver 100 includes a digital to analog converter (DAC) for transmission, and an analog to digital converter (ADC) for reception. The hybrid circuit 130 is designed to reduce the level the transmit signal present in the receive signal path. The transmitter section 110 and the receiver section 120 are connected to a common twisted pair (transmission channel 135) causing some of the transmission signals of the transmitter section 110 to be coupled into the receive signals of the receiver section 120. The coupled signal can be referred to as an "echo" signal. The echo signal can include two separate primary components. The first component includes transmission signals due to the direct connection of the transmitter sections to the input of the receiver sections. The second component includes reflections of the transmit signal within the transmission channel.

The hybrid circuit 140 of the second transceiver 105 operates in the same manner as the hybrid circuit 130 of the first transceiver 100. The transmitter section 150 and the receiver section 160 of the second transceiver 105 operate in the same manner as the transmitter section 110 and receiver section 120 of the first transceiver 100.

An implementation of high speed Ethernet networks includes simultaneous, full bandwidth transmission, in both directions (termed full duplex), within a selected frequency band. When configured to transmit in full duplex mode, Ethernet line cards are generally required to have transmitter and receiver sections of an Ethernet transceiver connected to each other in a parallel configuration to allow both the transmitter and receiver sections to be connected to the same twisted wiring pair for each of four pairs. As a result, each of the four receivers typically suffers from echo signal interference.

Figure 2:
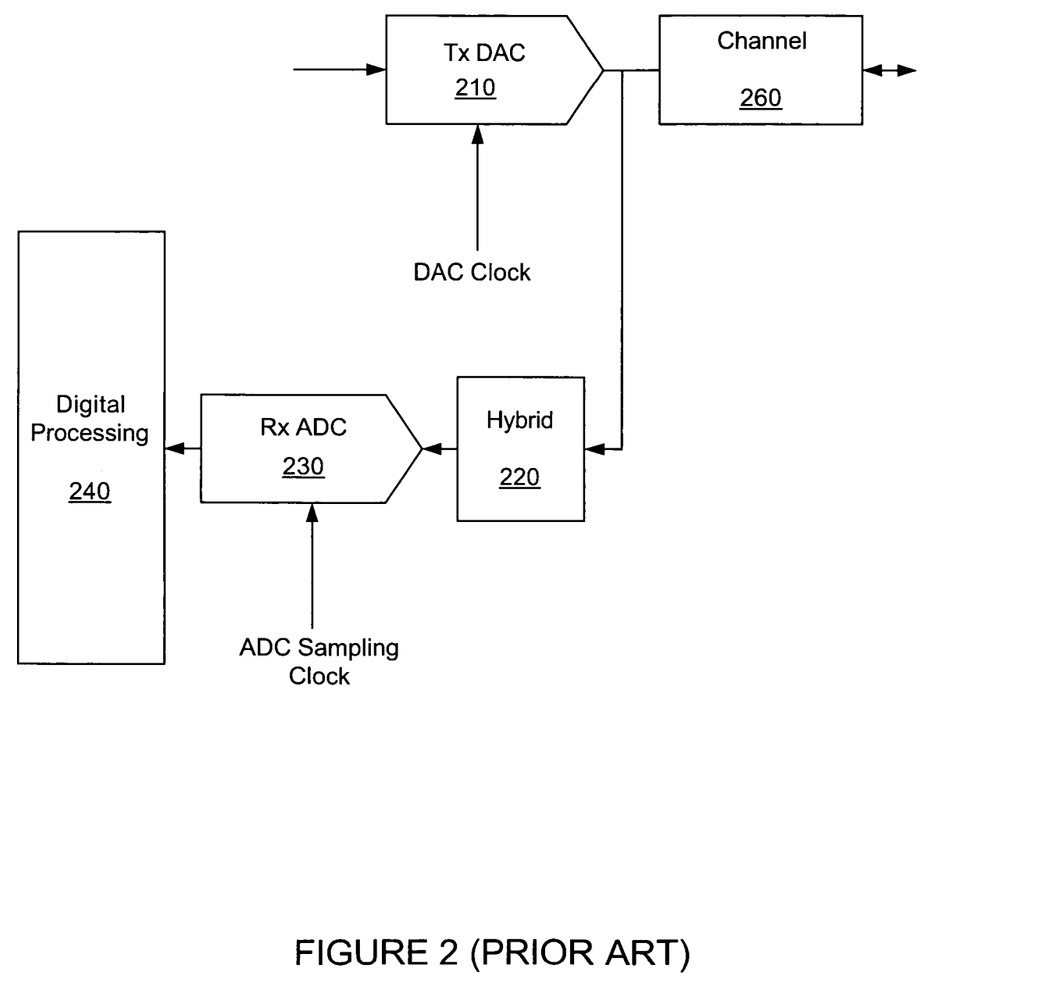
FIG. 2 shows a prior art Ethernet transceiver that includes echo cancellation circuitry and processing.

FIG. 2 shows an Ethernet transceiver that includes an exemplary echo cancellation circuits. The transceiver includes a transmit DAC 210 for converting digital transmission signals to analog transmission signals. The analog transmission signals of the DAC 210 are coupled (in some cases through line drivers) to a transmission channel 260. A receiver section of the transceiver is also coupled to the transmission channel 260 for receiving desired signals of the transmission channel 260. The receiver includes the previously described hybrid circuit 220 which mitigates the effects of echo signals.

The analog output of the hybrid is sampled by a receiver ADC 230, generating digital samples. The digital samples are processed by digital processing circuitry 240. Some echo interference is still present after the signals (desired and echo) have been passed through the hybrid circuit 220, and received by the digital processing circuitry. Some prior art methods of additionally canceling the echo signals include MMSE (minimum means squared error) algorithms performing linear echo cancellation. However, noise and non-linear components caused by the echo signal cannot be cancelled with traditional DSP algorithms and methods leading to SNR loss in the receiver. Additionally, large amounts of echo signal at the receiver ADC reduces the dynamic range of the receiver ADC and constrains performance of the receiver ADC.

It is desirable to minimize the amount of echo signal at a receiver ADC of a transceiver, and to improve cancellation of the echo signal causing signal processing of the transceiver to be low noise and highly linear.

SUMMARY OF THE INVENTION

An embodiment of the invention includes a full-duplex transceiver. The transceiver includes a transmitter DAC coupled to a transmission channel. The transmit DAC converting a digital transmission signal into an analog transmission signal. The transceiver further includes a receiver connected to the transmission channel. The receiver receives a desired signal and an echo signal, in which the echo signal includes at least a portion of the analog transmission signal. The receiver includes a receiver ADC, a programmable delay line for adjustably delaying a clock signal of the ADC, and a receiver processing circuit for adjusting the delay of the clock signal based at least in part upon the echo signal.

Another embodiment includes a method of echo signal cancellation within a transceiver. The method includes a transmitter DAC transmitting an analog transmission signal on a transmission channel, the transmitter DAC being clocked with transmit DAC clock signal. A receiver receives a desired signal, and an echo signal, wherein the echo signal includes at least a portion of the analog transmission signal. The desired signal and the echo signal are digitally sampled by a receiver ADC. A clock signal of the ADC is adjustably delayed, the delay being adjusted at least in part upon the echo signal.

Other aspects and advantages of the present invention will become apparent from the following detailed description, taken in conjunction with the accompanying drawings, illustrating by way of example the principles of the invention.

DETAILED DESCRIPTION

The invention includes an apparatus and method sampling signals that are subject to echo signals. The sampling circuitry includes strategically timing sampling of received signals so that the effects of the echo signals can be minimized.

Figure 3:
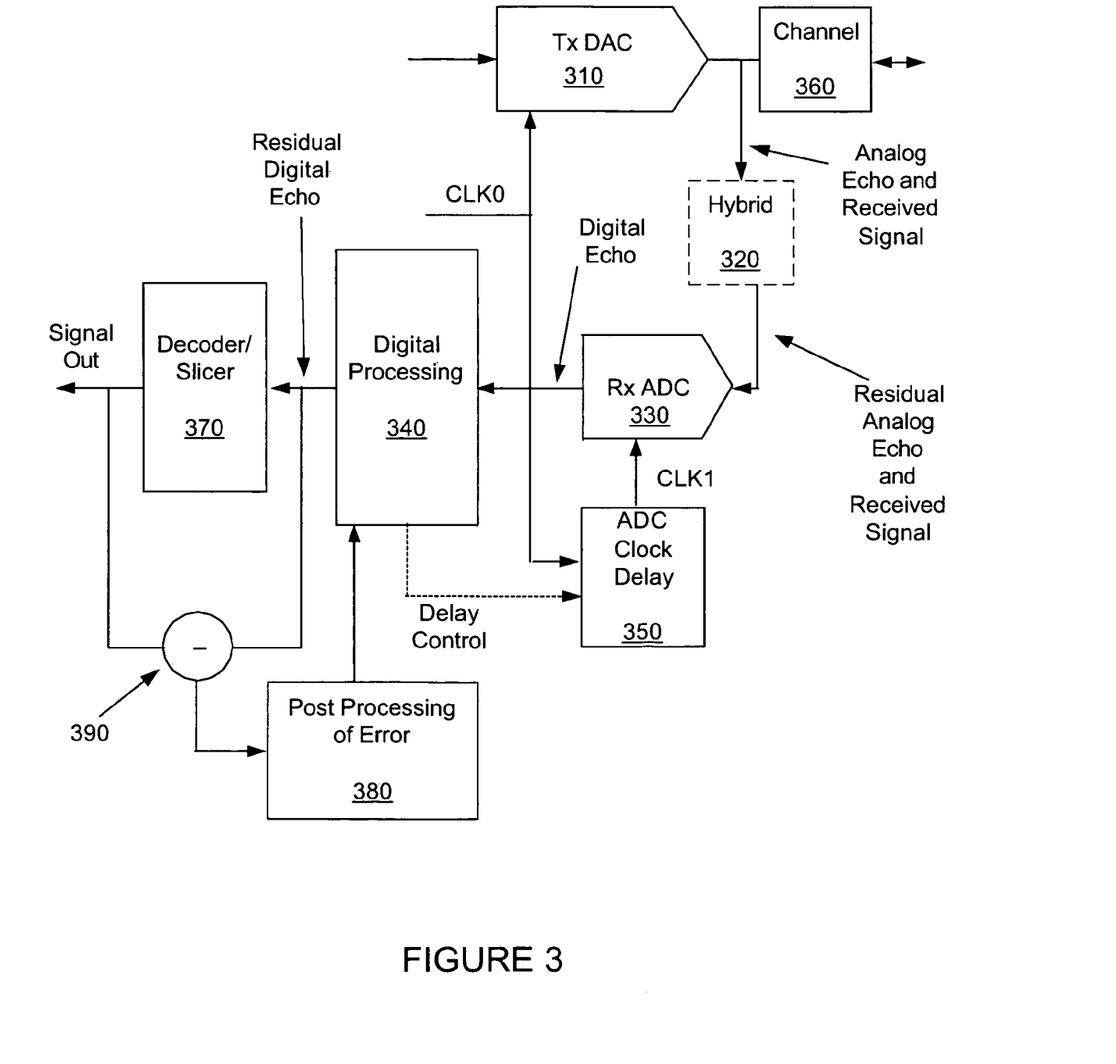
FIG. 3 shows exemplary receiver sampling circuitry for reducing the effects of echo signals.

FIG. 3 shows exemplary receiver sampling circuitry for reducing the effects of echo signals. The receiver circuitry includes a portion of a full-duplex transceiver. The transceiver includes a transmitter DAC 310 coupled to a transmission channel 360. The transmit DAC 310 converts digital transmission signals into an analog transmission signals before transmission through the transmission channel 360. A common implementation additionally includes a line driver between the transmitter DAC 310 and the transmission channel 360. A common Ethernet transmission channel is a twisted pair of copper wires. The transceiver includes a receiver that is also connected to the transmission channel 360. The receiver receives a desired signal, and an echo signal, in which the echo signal includes at least a portion of the transmission signal. The receiver includes a receiver ADC 330, a programmable delay 350 for adjustably delaying a first clock signal (CLK1) of the ADC 330, and receiver processing circuitry 340 for adjusting the delay of the first clock signal (CLK1) based at least in part upon the echo signal.

A clock signal CLK0 is connected to the transmitter DAC 310. The first clock signal CLK1 is a delayed version of the clock CLK0 as determined by the ADC clock delay 350. The receiver processing circuitry (typically within a DSP (digital signal processing chip)) and the programmable delay 350 control the phase delay of the clock signal so that the effects of the echo signals can be greatly reduced. The phase of the ADC sampling clock is adjusted to provide optimal echo cancellation within the receiver because the echo signal is highly linear, noise in the echo signal due to jitter of the transmitter DAC clock signal is low, and/or the echo signal sampled by the receiver ADC is low.

The hybrid 320 is optionally included (dashed representation), and provides analog echo cancellation of the echo signals coupled to the receiver. The hybrid 320 may not completely cancel the effects of the echo signals, and a residual echo signal is still present after the hybrid 320. The digital processing circuitry 340 reduces the effects the residual echo signal has on the desired receive signals.

The digital processing circuitry 340 effectively provides additional echo cancellation through processing of the digital signal samples generated by the receiver ADC 330. Selectively setting the timing of the sampling of the receiver ADC provides the digital processing circuitry with signals that are more linear, have less noise and less echo signals.

The echo signal is generally present in different forms within the transceiver of FIG. 3. As shown in FIG. 3, the signals prior to the hybrid 320 include the analog echo signal and the received signal of the transmission channel 360. Echo signal cancellation by the hybrid 320 reduces the analog echo signal, and the output of the hybrid is essentially the received signal and a residual analog echo signal. The receiver ADC generates digital samples that include the received signal and a digital echo signal. The digital processing circuitry 340 provides additional cancellation of the digital echo, producing a residual digital echo signal (and of course, the received signal). Decoder/slicer circuitry 370 provides a final estimate of digital values of the received signal, generating a signal output. An output of the decoder/slicer 370 can be compared with an input of the decoder/slicer through compare circuitry 390, allowing post processing circuitry 380 to further process signal errors.

The digital processing circuitry can include MMSE (minimum mean square error) adaptive algorithms for canceling the residual echo signals. An exemplary MMSE algorithm is an LMS (least mean square) algorithm.

Figure 4:
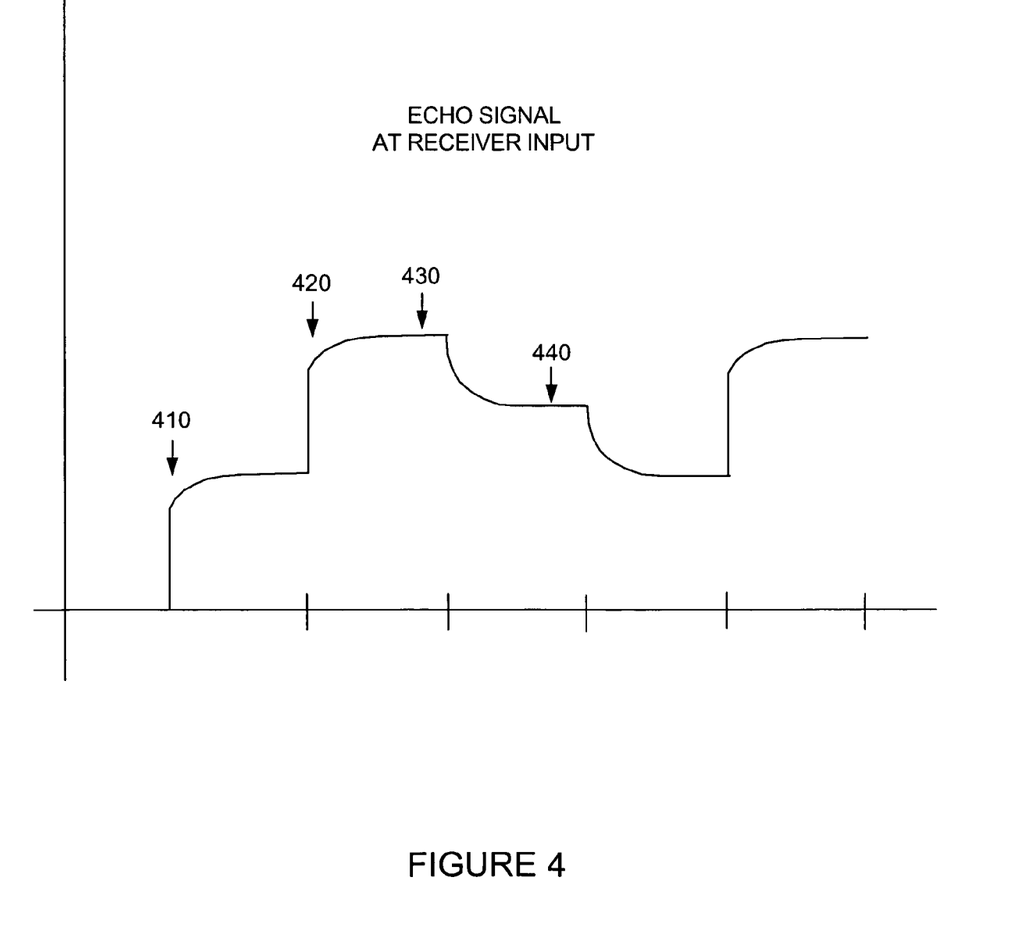
FIG. 4 shows a zero order hold waveform of an echo signal.

FIG. 4 shows a zero order hold waveform of an echo signal at, for example, the receiver input. Observation of the echo signal waveform reveals to some extent why controlling the timing of the sampling can help to minimize the effects of the echo signal. The echo signal is typically a delayed, and attenuated version of transmission signal. As shown in FIG. 4, the echo signal typically includes regions of transition, and regions of relative stability. The relative magnitude of the echo signal compared to the received desired signal can be large.

As previously described, the receiver ADC 330 samples signals that include both a desired receive signal, and the undesired echo signal. The timing of the sampling of the receiver ADC 330 can greatly influence the effect of the echo signal upon processing of received signals within the digital processing circuitry 340. For example, if the sampling of the receiver ADC 330 occurs approximately at transition edges 410, 420 of the echo signal, the deleterious effects of the echo signal are much greater. Sampling at the transition edges results in greater non-linearity because the echo and transmit signals are very non-linear at the edges. Sampling at the transition edges 410, 420 also results in and jitter of the sampling clock. Sampling of the receiver ADC 330 at relatively stable portions of the echo signal such as portions 430, 440 provide much more stable digital samples that are much less likely to suffer echo noise due to jitter of the sampling clock. The transitions of the echo signal are determined by the transmission DAC clock signal. Sampling the receiver ADC at the transition times of the echo signal makes noise of the samples sensitive to jitter of the transmission DAC clock signal.

Delay Line Control

The general premise of delaying the receiver ADC clock signal is to set the timing of the sampling so that the sampling occurs at a point in time in which the echo signal is more or less stable, as depicted by the points 430, 440 of FIG. 4. Because the echo signals are directly caused by the analog transmission signals, the transitions of the echo signal are directly related to the transitions of the analog transmission signal. Therefore, the sampling of the receiver ADC can be delayed relative to the transmission DAC clock signal. Generally, the receiver processing circuitry (which can be implemented with a DSP circuit) can control the programmable delay line so that sampling of the receiver ADC provides an optimal range of echo signal cancellation.

Several parameters can be used to determine the optimal range of echo signal cancellation. The delay of the ADC clock signal (sampling) can be adjusted so that sampling of the receiver ADC occurs when linearity of the echo signal is above a threshold. More generally, the delay is adjusted in an attempt to maximize the linearity of the echo signal. Absolute maximization may not be obtained, but adjustment of the delay of the receiver ADC clock signal can be made until the linearity of the echo signal is at least as good as a predetermined threshold.

The delay of the ADC clock signal (sampling) can be adjusted so that sampling of the receiver ADC occurs when noise in the echo signal due to jitter of the clock the transmitter DAC is below a threshold. As previously stated, the transitions of the echo signal are correlated with the transitions of the analog transmission signal. At the transition points, the noise due to jitter of the transmitter DAC is the highest. Therefore, by delaying the sampling of the receiver ADC to occur away from the transitions (again, as shown in FIG. 4 at points 430, 440), echo noise due to jitter of the transmit DAC clock signal can be reduced or minimized. Absolute minimization may be difficult to achieve, but the noise can be limited to a predetermined threshold.

The digital processing circuitry 340 provides the control for the delay of the receiver ADC clock. Generally, the digital processing circuitry 340 adjusts the receiver ADC clock signal until a processed received signal provides a threshold level of bit error rate (BER) or signal to noise ratio (SNR). That is, the digital processing circuitry 340 receives the desired receive signal in addition to the undesired echo signal and noise. The digital processing circuitry 340 adjusts the delay of the receiver ADC clock signal to improve the BER or SNR of the processed received signal. It may not be realistic to actually achieve the best or optimal BER or SNR, but the receiver ADC clock signal can be adjusted to obtain a BER or SNR that is better than a predetermined threshold.

Threshold

An exemplary predetermined threshold includes an SNR threshold required for 10GBase-T Ethernet. One predetermined SNR threshold for 10GBase-T Ethernet is an SNR of +23.5 dB. The SNR threshold of +23.5 dB is at the input of the decoder 370. The phase of the receiver ADC clock can be adjusted until the SNR reaches this threshold. The phase can then be additionally adjusted to provide additional SNR margin.

Methods for determining the BER or SNR of the received signal include determinations of a mean squared error (MSE), a decision point mean squared error (DPMSE), a decision point peak error rate (DPPER) or a post-processed decision point mean squared error.

MSE is a digital communications concept that provides a representation of the error associated with digital signals. For N-QAM signals, amplitude and phase constellations define the digital value of a signal. A decision point mean squared error (DPMSE) provides and estimate of the error of a signal relative to a specific decision point prior to a slicer (such as decoder/slicer 370) or error correcting processing unit. A decision point peak error rate (DPPER) provides an estimate of peak error of a signal relative to a specific decision point.

The error post processing circuitry 380 of FIG. 3 can be used for determining several characteristics of the signal errors as influenced by the echo signals. The post processing can include computing the mean of the squares of the error (MSE), computing the maximum amplitude of the error over a period of time, or computing the probability distribution function (pdf) of the error and evaluating how often the error of above a threshold. Algorithms for computing each of the post processing errors are computed in the time domain. Typically, error correcting codes (including slicers) are sensitive to the pdf of the errors in addition to the average or root mean square (rms) of the errors (as provided by MSE).

Additionally, the post-processing can include frequency domain processing. Computing the frequency domain characteristics of the error allows evaluation of the behavior of the error at different frequencies. For example, jitter noise is typically greater at higher frequencies. The statistical properties of the error (MSE, DPMSE, DPPER and so forth) can typically be computed more accurately with frequency domain processing. The delay settings of the receiver ADC or the EC DAC clock signal can be improved by evaluating the frequency domain response of the error prior to post processing, such as, computing the mean of the squares of the error (MSE), computing the maximum amplitude of the error over a period of time, or computing the probability distribution function (pdf) of the error.

Figure 5:
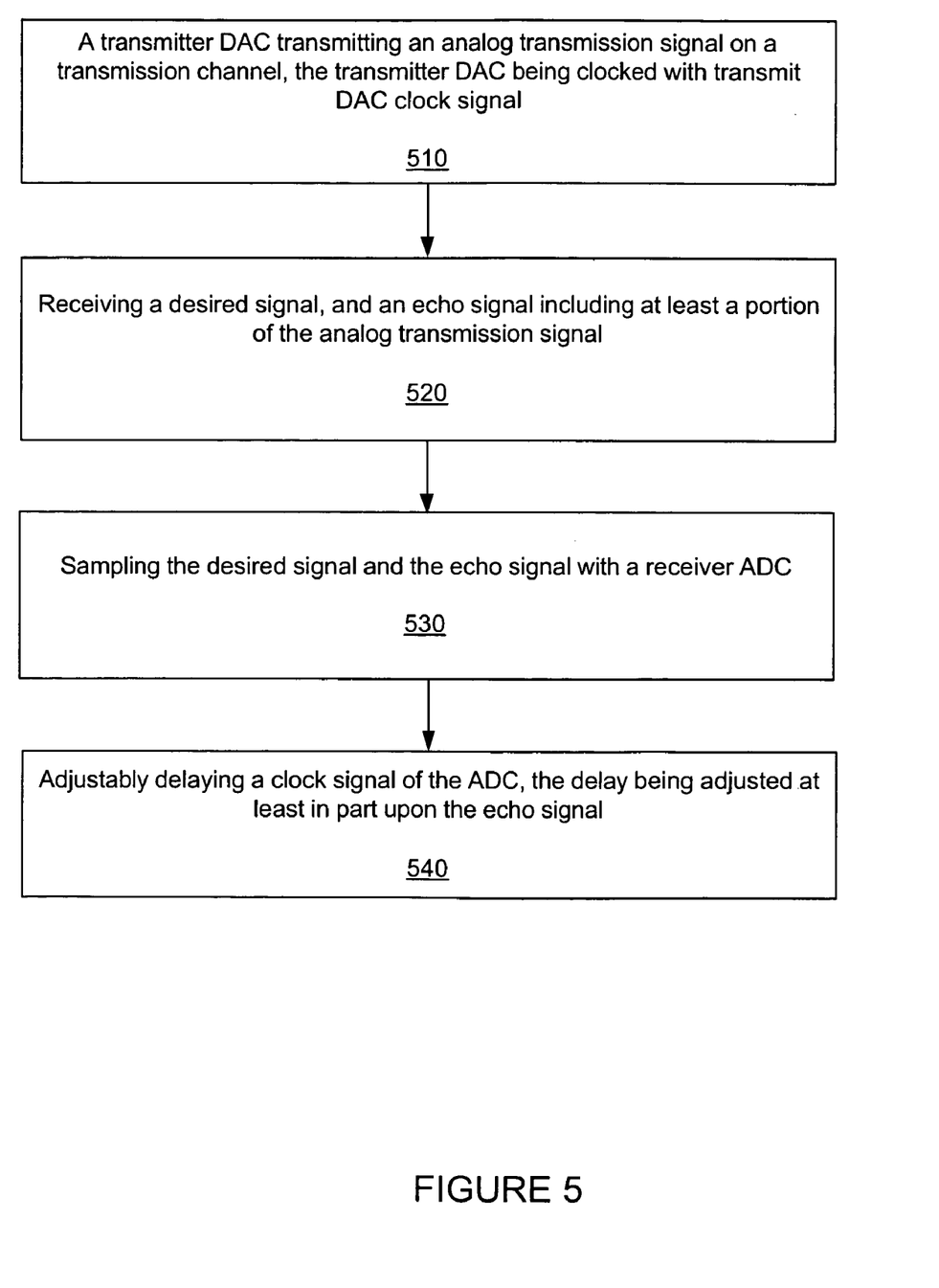
FIG. 5 shows a method of receiver sampling for reducing the effects of echo signals.

FIG. 5 shows a method of echo signal cancellation within a transceiver. A first step 510 includes a transmitter DAC transmitting an analog transmission signal on a transmission channel, the transmitter DAC being clocked with transmit DAC clock signal. A second step 520 includes receiving a desired signal, and an echo signal comprising at least a portion of the analog transmission signal. A third step 530 includes digitally sampling the desired signal and the echo signal with a receiver ADC. A fourth step 540 includes adjustably delaying a clock signal of the ADC, the delay being adjusted at least in part upon the echo signal.

Methods of delaying the ADC clock signal include adjusting the clock delay so that the ADC sampling occurs when linearity of the echo signal is above a threshold, when noise of a sampled echo signal due to jitter of the transmitter DAC clock signal is below a threshold, and when an amount of echo signal sampled by the receiver ADC is below a threshold.

Figure 6:
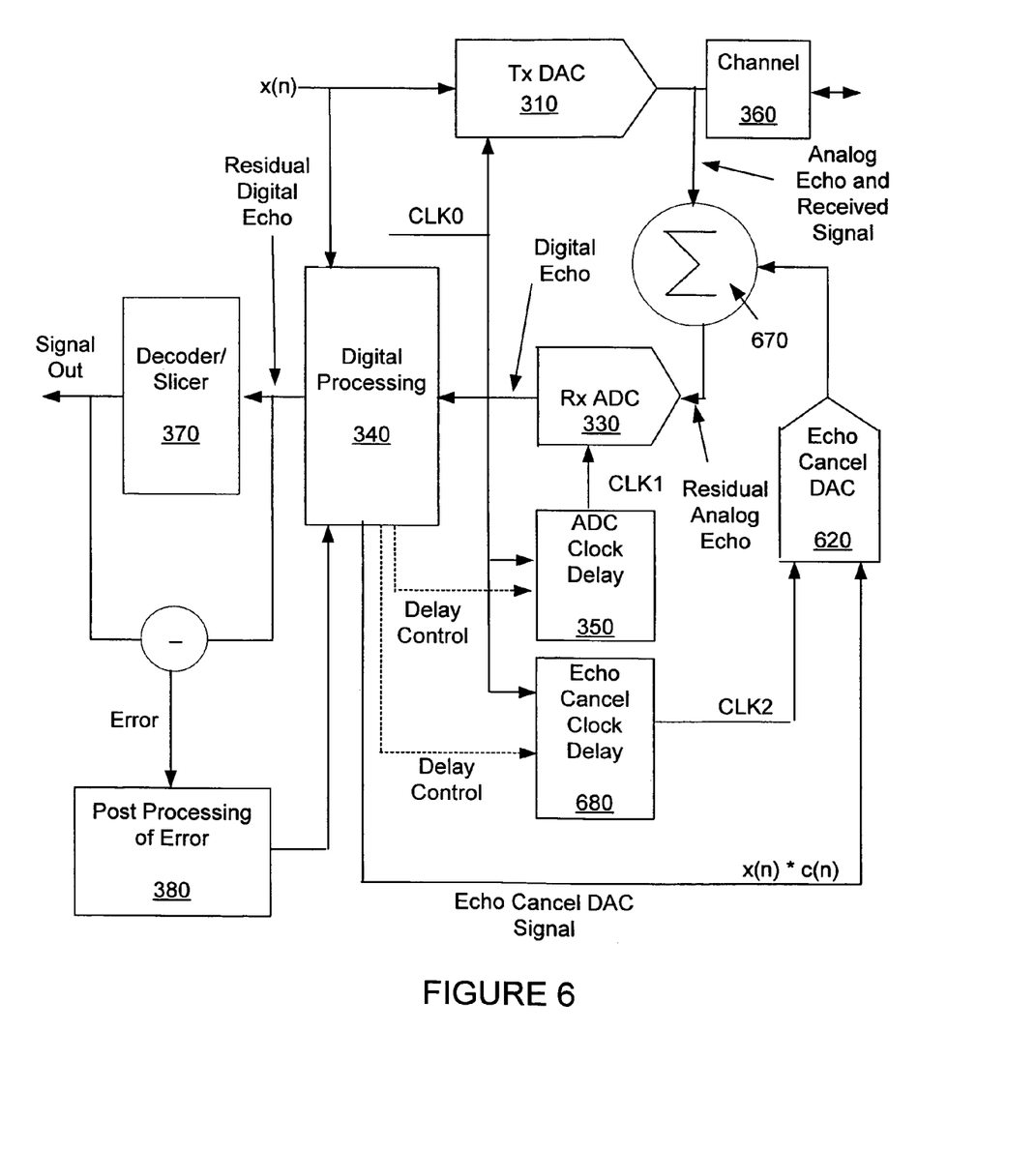
FIG. 6 shows another exemplary receiver sampling circuitry for reducing the effects of echo signals.

FIG. 6 shows another exemplary receiver sampling circuitry for reducing the effects of echo signals. This receiver within a transceiver additionally includes an echo cancellation (EC) DAC 620. The EC DAC 620 provides an estimated echo signal which can be summed with the desired signal and the echo signal at a summer 670 to provide cancellation of the echo signal previous to the receiver ADC 330.

The receiver of FIG. 6 additionally includes an echo cancel clock delay 680. Embodiments include the delay of the clock to the EC DAC 620 being set to a fixed value, or the delay being programmable by the digital processing circuitry 340.

The analog estimated echo signal is summed with received signal (desired signal and echo signal) to cancel as much of the echo signal as possible. The greater the amount of echo signal cancelled as the summer, the easier it is for the digital processing circuitry to provide additional cancellation of the residual echo signal.

With the addition of the summer 670 and the EC DAC 620, there are several locations in which reduction of the effects of echo signals can be observed. More specifically, adjustments can be made at the EC DAC 620 (both EC DAC clock signal delay (fixed or adjustable) and the digital EC DAC value received from the digital processing 340), at the receiver ADC 330 (receiver ADC clock signal), and within the digital processing circuitry 340.

Programmable Delay of the EC DAC Clock Signal

The estimated echo signal is an analog signal that is based upon a digital estimated echo signal that can be generated by the digital processing circuitry 340. The estimated echo signal is based upon processing a corresponding transmission signal. The transmission signal can be designated digitally as $x(n)$, and the digital estimated echo signal can be represented as $x(n)*c(n)$ where the symbol "*" denotes a convolution and $c(n)$ represents coefficients of a preprocessing digital filter.

The preprocessing digital filter $c[n]$ (which can be included within a preprocessor within the digital processing 340) can be computed by adaptive algorithms (such as, LMS or RLS) that are adjusted to minimize error resulting at a particular point in the receiver (for example, at the receiver ADC output). Different settings of the phase delay of the receiver ADC clock signal and the EC DAC clock signal phase delay results in different values for the computed digital filter c[n]. If the computed filter results in a complicated impulse response (that is, large values for several filter coefficients) this indicates that the delay selection is a poor one, and should be readjusted for computation of a less complicated filter. The transmission DAC has periods in which its output is stable. The EC DAC has periods in which its output is stable. Sampling during these stable periods provides the receiver with higher linearity and less noise. The receiver digital processing adjusts the phase of the EC DAC clock signal and the phase of the receiver ADC clock signal to ensure that sampling occurs during the stable portions of the signals. The stable portions of the transmission DAC and the EC DAC can occur at different times.

The EC DAC clock signal phase delay is optimum when the filter coefficients are such that one of the coefficients is substantially greater than the other coefficients. This indicates that both the transmitter DAC 310 and the EC DAC 620 are essentially settled.

Figure 7:
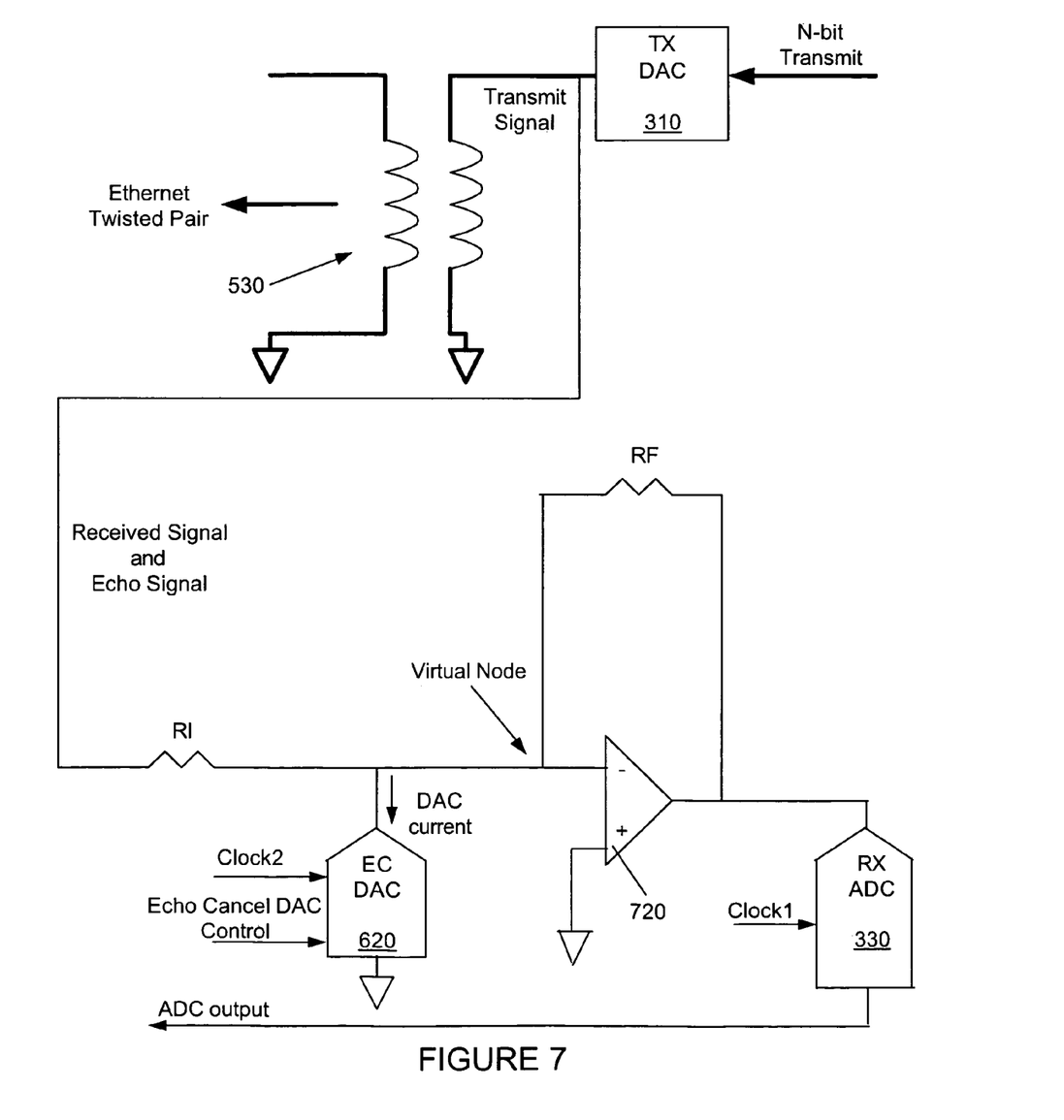
FIG. 7 shows a portion of the exemplary receiver sampling circuitry which includes summer circuitry.

FIG. 7 shows a portion of the exemplary receiver sampling circuitry which includes summer circuitry. The signal input to the summer circuitry includes a received signal, and an echo signal. The echo signal, as previously described, is an undesired signal that is coupled into the received signal because the transceiver that includes the preprocessing circuit is transmitting signals simultaneous with the transceiver receiving other signals.

The EC DAC 620 can provide a programmable current for canceling the echo signal. In one embodiment, the EC DAC 620 can be used to generate current that negates current at a virtual node (of amplifier 720) induced by the echo signal present at the input of the preprocessing circuit. The result is that the echo current and received signal current flows through an input resistor RI, but the echo current does not flow through a feedback resistor RF, thereby subtracting the echo signal from the output. The EC DAC 620 can just as easily sinks current rather than sourcing current as shown.

The programmable current source can be controlled by estimating the echo signal. The estimate can be based upon digital filtering of the transmit signals of the transceiver.

Figure 8:
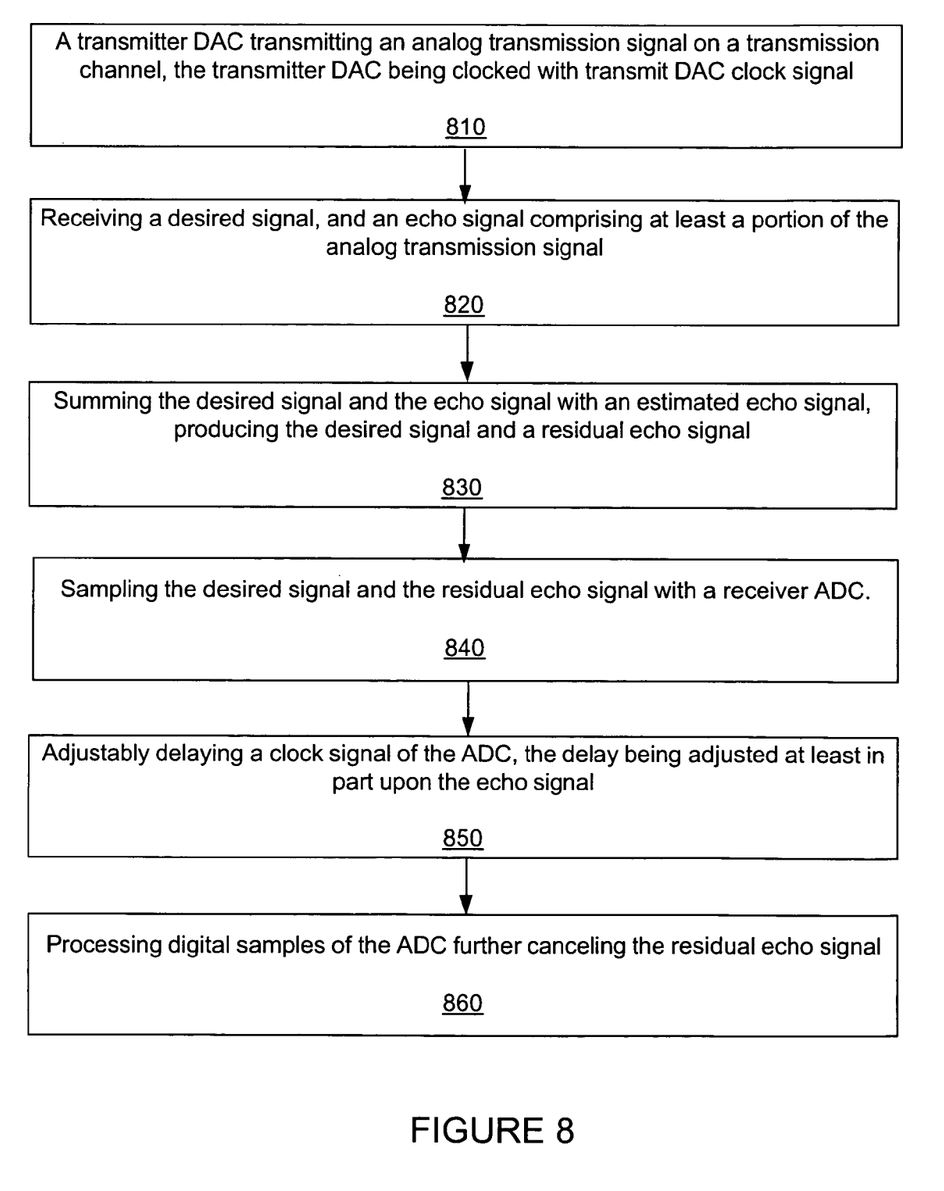
FIG. 8 shows another method of receiver sampling for reducing the effects of echo signals.

FIG. 8 shows another method of echo signal cancellation within a transceiver. A first step 810 includes a transmitter DAC transmitting an analog transmission signal on a transmission channel, the transmitter DAC being clocked with transmit DAC clock signal. A second step 820 includes receiving a desired signal, and an echo signal comprising at least a portion of the analog transmission signal. A third step 830 includes summing the desired signal and the echo signal with an estimated echo signal, producing the desired signal and a residual echo signal. A fourth step 840 includes sampling the desired signal and the residual echo signal with a receiver ADC. A fifth step 850 includes adjustably delaying a clock signal of the ADC, the delay being adjusted at least in part upon the echo signal. A sixth step 860 includes processing digital samples of the ADC further canceling the residual echo signal.

The delay being adjusted so that the ADC sampling occurs when a linearity of the echo signal is above a threshold, noise of a sampled echo signal due to jitter of the clock signal of the transmitter DAC is below a threshold, and/or an amount of echo signal sampled by the receiver ADC is below a threshold.

Another embodiment includes the estimated echo signal being delayed. This delay can be controlled by controlling a phase delay of an EC DAC associated with the estimated echo signal.

Figure 9:
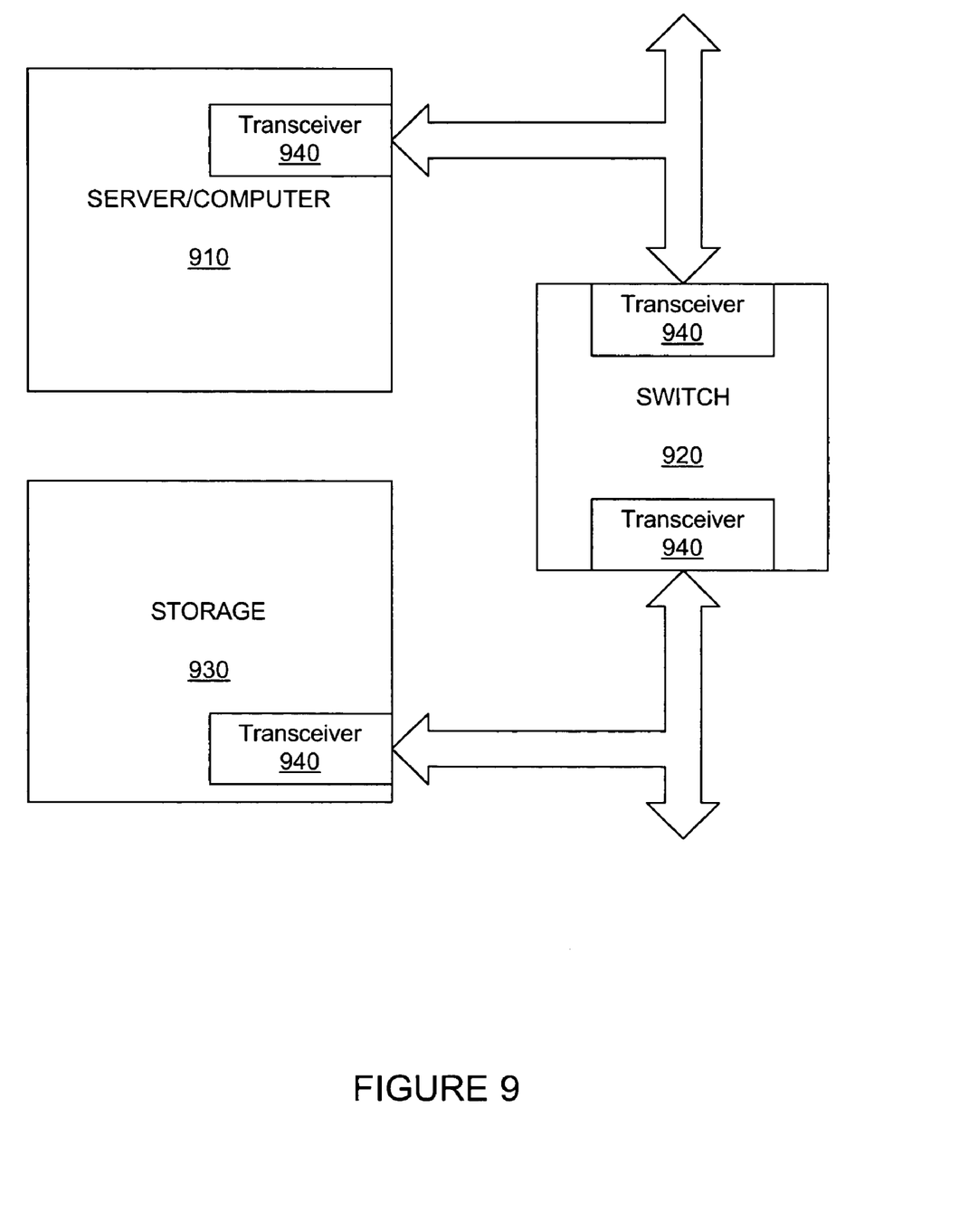
FIG. 9 shows several networking devices that include receiver sampling circuitry similar to the embodiments of FIGS. 3, 6, 7.

FIG. 9 shows devices connected to an Ethernet network that can include embodiments of the receiver sampling circuitry for reducing the effects of echo signals. The receiver sampling circuitry for reducing the effects of echo signals can be included with Ethernet transceivers. The Ethernet transceivers can be included within a server 910, a switch 920 or a storage device 930. Clearly, other types of devices could use the Ethernet transceivers as well.

Although specific embodiments of the invention have been described and illustrated, the invention is not to be limited to the specific forms or arrangements of parts so described and illustrated. The invention is limited only by the appended claims.

What is claimed:

1. A full-duplex transceiver comprising:
a transmitter digital to analog converter (DAC) coupled to a transmission channel, the transmitter digital to analog converter (DAC) converting a digital transmission signal into an analog transmission signal;
a receiver connected to the transmission channel, the receiver receiving a desired signal, and an echo signal comprising at least a portion of the analog transmission signal, the receiver comprising;
a receiver analog to digital converter (ADC);
a programmable delay line for adjustably delaying a clock signal of the receiver analog to digital converter (ADC);
receiver processing circuit for adjusting the delay of the clock signal based at least in part upon the echo signal, wherein the delay of the clock signal is adjusted so that sampling of the analog to digital converter (ADC) occurs when the echo signal is below a threshold and linearity of the echo signal is above a threshold; and
a summer circuit coupled to the input of the receiver, for summing the desired signal and the echo signal with an estimated echo signal to provide cancellation of the echo signal previous to the receiver analog to digital converter (ADC).

2. The transceiver of claim 1, wherein the receiver processing circuit comprises a digital signal processing (DSP) circuit for controlling the programmable delay line so that sampling of the receiver analog to digital converter (ADC) provides an optimal range of echo signal cancellation.

3. The transceiver of claim 1, wherein the delay of the clock signal is adjusted so that receiver analog to digital converter (ADC) sampling occurs when linearity of the echo signal is above a threshold, noise in the echo signal due to jitter of the clock the transmitter digital to analog converter (DAC) is below a threshold, and an amount of echo signal sampled by the receiver analog to digital converter (ADC) is below a threshold.

4. The transceiver of claim 1, wherein the delay of the clock signal is adjusted so that sampling of the receiver analog to digital converter (ADC) occurs when noise in the echo signal due to jitter of the clock of the transmitter digital to analog converter (DAC) is below a threshold.

5. The transceiver of claim 1, wherein the delay of the clock signal is adjusted until a processed received signal provides a threshold level of bit error rate (BER) or signal to noise ratio (SNR).

6. The transceiver of claim 1, wherein the delay of the clock signal is adjusted until a processed received signal provides a threshold level of Decision Point Mean Square Error (DPMSE).

7. The transceiver of claim 1, wherein the delay of the clock signal is adjusted until a processed received signal provides an optimal bit error rate (BER) or signal to noise ratio (SNR).

8. The transceiver of claim 1, wherein the delay of the clock signal is adjusted until a processed received signal provides a minimum Decision Point Mean Square Error (DPMSE).

9. The transceiver of claim 1, wherein the delay of the clock signal is adjusted until echo cancellation of a processed received signal provides a threshold level of a decision point peak error rate (DPPER).

10. The transceiver of claim 1, wherein the delay of the clock signal is adjusted so that after echo signal cancellation, a post-processed decision point error is below a threshold.

11. The transceiver of claim 10, wherein the post-processed decision point error comprises at least one of a mean error, a peak error or a probability density function error.

12. The transceiver of claim 10, wherein the post-processed decision point error is transformed to a frequency domain, and the frequency domain error comprises at least one of a mean error, a peak error or a probability density function error.

13. The transceiver of claim 1, wherein the summer circuit comprises:
an amplifier having a virtual ground node;
a feed back circuit from an output of the amplifier to the virtual ground node;
an adjustable echo cancellation digital to analog converter (DAC), an output of the echo cancellation digital to analog converter (DAC) being summed at the virtual ground node, the adjustable echo cancellation digital to analog converter (DAC) being adjusted according to an estimated echo signal.

14. The transceiver of claim 13, further comprising an echo cancellation delay circuit for delaying an echo cancellation digital to analog converter (DAC) clock signal of the echo cancellation digital to analog converter (DAC) with respect to the receiver digital to analog converter (DAC).

15. The transceiver of claim 14, further comprising a delay of the echo cancellation delay circuit being programmably controlled by the receiver processing circuit.

16. The transceiver of claim 14, wherein a delay of the echo cancellation delay circuit is fixed.

17. The transceiver of claim 14, wherein the receiver processing circuit controls the delay of the echo cancellation delay circuit to enhance echo signal cancellation provided by the echo cancellation digital to analog converter (DAC).

18. The transceiver of claim 14, wherein the receiver processing circuit controls the delay of the echo cancellation delay circuit to optimize an echo cancellation digital to analog converter (DAC) preprocessor signal.

19. The transceiver of claim 18, wherein the echo cancellation digital to analog converter (DAC) preprocessor is a digital filter.

20. The transceiver of claim 19, wherein the echo cancellation digital to analog converter (DAC) preprocessor is optimized when the signal energy of coefficients of the digital filter is focused on a single coefficient.

21. A method of echo signal cancellation within a transceiver, comprising:
a transmitter digital to analog converter (DAC) transmitting an analog transmission signal on a transmission channel, the transmitter digital to analog converter (DAC) being clocked with transmit digital to analog converter (DAC) clock signal;
receiving a desired signal, and an echo signal comprising at least a portion of the analog transmission signal;
digitally sampling the desired signal and the echo signal with a receiver analog to digital converter (ADC); and
adjustably delaying a clock signal of the analog to digital converter (ADC), the delay being adjusted at least in part upon the echo signal, wherein the delay of the clock signal is adjusted so that sampling of the analog to digital converter (ADC) occurs when the echo signal is below a threshold and linearity of the echo signal is above a threshold; and
a summer circuit coupled to the input of the transceiver, for summing the desired signal and the echo signal with an estimated echo signal to provide cancellation of the echo signal previous to the receiver analog to digital converter (ADC).

22. The method of claim 21, further comprising the delay analog to digital converter (ADC) clock signal being adjusted so that the analog to digital converter (ADC) sampling occurs when noise of a sampled echo signal due to jitter of the transmitter digital to analog converter (DAC) clock signal is below a threshold.

23. The method of claim 21, further comprising the delay being adjusted so that the analog to digital converter (ADC) sampling occurs where the linearity of the echo signal is above a threshold, and noise of a sampled echo signal due to jitter of the transmitter digital to analog converter (DAC) clock signal is below a threshold, and an amount of echo signal sampled by the receiver analog to digital converter (ADC) is below a threshold.

24. A method of echo signal cancellation within a transceiver, comprising:
a transmitter digital to analog converter (DAC) transmitting an analog transmission signal on a transmission channel, the transmitter digital to analog converter (DAC) being clocked with a transmit digital to analog converter (DAC) clock signal;
receiving a desired signal, and an echo signal comprising at least a portion of the analog transmission signal;
summing the desired signal and the echo signal with an estimated echo signal, producing the desired signal and a residual echo signal;
sampling the desired signal and the residual echo signal with a receiver analog to digital converter (ADC);
adjustably delaying a clock signal of the analog to digital converter (ADC), the delay being adjusted at least in part upon the echo signal, wherein the delay of the clock signal is adjusted so that sampling of the analog to digital converter (ADC) occurs when the echo signal is below a threshold and linearity of the echo signal is above a threshold; and
a summer circuit coupled to the input of the transceiver, for summing the desired signal and the echo signal with an estimated echo signal to provide cancellation of the echo signal previous to the receiver analog to digital converter (ADC);
processing digital samples of the analog to digital converter (ADC) further canceling the residual echo signal.

25. The method of claim 24, further comprising the delay being adjusted so that the analog to digital converter (ADC) sampling occurs when noise of a sampled echo signal due to jitter of the transmitter digital to analog converter (DAC) is below a threshold.

26. The method of claim 24, further comprising adjustably delaying a phase of the estimated echo signal.

27. The method of claim 26, wherein the phase of the estimated echo signal is adjusted by adjusting a delay of a clock signal of an echo cancellation digital to analog converter (DAC) of the estimated echo signal.

* * * * *